United States Patent
Toshev et al.

(10) Patent No.: US 11,701,773 B2
(45) Date of Patent: Jul. 18, 2023

(54) VIEWPOINT INVARIANT VISUAL SERVOING OF ROBOT END EFFECTOR USING RECURRENT NEURAL NETWORK

(71) Applicant: Google LLC, Mountain View, CA (US)

(72) Inventors: Alexander Toshev, San Francisco, CA (US); Fereshteh Sadeghi, Mountain View, CA (US); Sergey Levine, Berkeley, CA (US)

(73) Assignee: GOOGLE LLC, Mountain View, CA (US)

( * ) Notice: Subject to any disclaimer, the term of this patent is extended or adjusted under 35 U.S.C. 154(b) by 757 days.

(21) Appl. No.: 16/622,181

(22) PCT Filed: Dec. 4, 2018

(86) PCT No.: PCT/US2018/063843
§ 371 (c)(1),
(2) Date: Dec. 12, 2019

(87) PCT Pub. No.: WO2019/113067
PCT Pub. Date: Jun. 13, 2019

(65) Prior Publication Data
US 2020/0114506 A1     Apr. 16, 2020

Related U.S. Application Data

(60) Provisional application No. 62/595,037, filed on Dec. 5, 2017.

(51) Int. Cl.
*G05B 19/04*     (2006.01)
*G05B 19/18*     (2006.01)
(Continued)

(52) U.S. Cl.
CPC ............ *B25J 9/163* (2013.01); *B25J 9/1697* (2013.01); *G05B 13/027* (2013.01); *G06N 3/044* (2023.01);
(Continued)

(58) Field of Classification Search
CPC ....... B25J 9/163; B25J 9/1697; G05B 13/027; G05B 2219/33056; G05B 2219/39391;
(Continued)

(56) References Cited

U.S. PATENT DOCUMENTS 9,811,074 B1 * 11/2017 Aichele .................. B25J 9/1656
2015/0148953 A1 * 5/2015 Laurent ................ G05B 13/026
700/250

(Continued)

FOREIGN PATENT DOCUMENTS

CN          103279039          9/2013

OTHER PUBLICATIONS

Efficient Visual Search for Objects in Videos by Josef Sivic and Andrew Zisserman (Year: 2008).*
(Continued)

*Primary Examiner* — Harry Y Oh
(74) *Attorney, Agent, or Firm* — Gray Ice Higdon

(57) ABSTRACT

Training and/or using a recurrent neural network model for visual servoing of an end effector of a robot. In visual servoing, the model can be utilized to generate, at each of a plurality of time steps, an action prediction that represents a prediction of how the end effector should be moved to cause the end effector to move toward a target object. The model can be viewpoint invariant in that it can be utilized across a variety of robots having vision components at a variety of viewpoints and/or can be utilized for a single robot even when a viewpoint, of a vision component of the robot, is drastically altered. Moreover, the model can be trained based
(Continued)

on a large quantity of simulated data that is based on simulator(s) performing simulated episode(s) in view of the model. One or more portions of the model can be further trained based on a relatively smaller quantity of real training data.

20 Claims, 7 Drawing Sheets

(51) Int. Cl.
*B25J 9/16* (2006.01)
*G05B 13/02* (2006.01)
*G06N 3/084* (2023.01)
*G06N 3/044* (2023.01)
*G06N 3/045* (2023.01)

(52) U.S. Cl.
CPC ............. *G06N 3/045* (2023.01); *G06N 3/084* (2013.01); *G05B 2219/33056* (2013.01); *G05B 2219/39391* (2013.01); *G05B 2219/40499* (2013.01); *G05B 2219/42152* (2013.01)

(58) Field of Classification Search
CPC ........... G05B 2219/40499; G05B 2219/42152; G06N 3/0445; G06N 3/0454; G06N 3/084; G06N 7/005; G06N 3/008
See application file for complete search history.

(56) References Cited

U.S. PATENT DOCUMENTS

2017/0178346 A1* 6/2017 Ferro .................... G06N 3/0445
2017/0334066 A1* 11/2017 Levine ................... B25J 9/1656

OTHER PUBLICATIONS

Finn, C. et al., "Deep Visual Foresight for Planning Robot Motion;" 2017 IEEE International Conference on Robotics and Automation (ICRA); pp. 2786-2793; May 29, 2017.
Kragic, D. et al., "Vision for Robotic Object Manipulation in Domestic Settings;" Robotics and Autonomous Systems, Elsevier Science Publishers; vol. 52, No. 1; pp. 85-100; Jul. 31, 2005.
Sivic, J. et al., "Efficient Visual Search for Objects in Videos;" Proceedings of the IEEE, vol. 96, No. 4; pp. 548-566; Apr. 1, 2008.
Rahmatizadeh, R. et al., "Vision-Based Multi-Task Manipulation for Inexpensive Robots Using End-to-End Learning for Demonstration;" retrieved from internet: URL:https://arix.org/pdf/1707.02920v1.pdf; 11 pages; Jul. 10, 2007.
DeMagistris, G. "Teaching a Robot Pick and Place Task using Recurrent Neural Network;" retrieved from internet: URL:https:///www.researchgate.net/profile/Giovanni_Magistris/publication/311585170_Teaching_a_Robot_Pick_and_Place_Task_using_Recurrent_Neural_Network/links/584f501a08ae4bc899398335.pdf; 5 pages; Dec. 1, 2016.
European Patent Office; International Search Report and Written Opinion of Ser. No. PCT/US2018/063843; 8 pages dated Jun. 19, 2019.
Finn, C. et al., "Deep Visual Foresight for Planning Robot Motion;" 8 pages; dated Mar. 13, 2017.
Tobin, J. et al., "Domain Randomization for Transferring Deep Neural Networks from Simulation to the Real World;" 8 pages; dated Mar. 20, 2017.
Chinese National Intellectual Property Administration; Notification of First Office Action issued in Application No. CN201880040068 9; 30 pages dated Jun. 2, 2022.
European Patent Office; Communication pursuant to Article 94(3) EPC issued in Application No. 18821946.3; 9 pages; dated Oct. 8, 2021.

* cited by examiner

VIEWPOINT INVARIANT VISUAL SERVOING OF ROBOT END EFFECTOR USING RECURRENT NEURAL NETWORK

BACKGROUND

Many robots are configured to utilize one or more end effectors to perform one or more robotic tasks, such as grasping and/or other manipulation task(s). For example, a robot can utilize a grasping end effector such as an "impactive" gripper or "ingressive" gripper (e.g., physically penetrating an object using pins, needles, etc.) to pick up an object from a first location, move the object to a second location, and drop off the object at the second location. Some additional examples of robot end effectors that may grasp objects include "astrictive" end effectors (e.g., using suction or vacuum to pick up an object) and "contigutive" end effectors (e.g., using surface tension, freezing or adhesive to pick up an object).

Various machine learning based approaches to robotic manipulation tasks, such as grasping, have been proposed. Some of those approaches train a machine learning model (e.g., a feedforward deep neural network) to generate one or more predictions that are utilized in visual servoing for robotic grasping, and train the machine learning model using training examples that are based on data from real-world physical robots attempting robotic grasps of various objects. For example, the machine learning model can be trained to predict a likelihood of successful grasp at each of a plurality of iterations, based on a corresponding image for the iteration and a candidate motion vector for the iteration. The corresponding image can be a most recent image captured by a vision sensor of a robot and the candidate motion vector can be a motion vector being considered for implementation by the robot. Based on the likelihood of successful grasp at each iteration, it can be determined whether to attempt a grasp or to instead implement the candidate motion vector and perform another iteration of predicting a likelihood of successful grasp.

However, these and/or other approaches can have one or more drawbacks. For example, some machine learning models that generate a prediction for use by a robot based at least in part on an input image from a vision component of the robot, can be robust where the vision component has a viewpoint that varies slightly relative to viewpoint(s) on which the machine learning model was trained—but can be inaccurate and/or fail for more severe variations in viewpoint. For instance, various approaches train a machine learning model to generate a manipulation prediction for a robot based at least in part on input images of training examples, where the input images for the training examples are all captured from the same or similar viewpoint. While such machine learning models are adaptable for use in robots capturing images from the same or similar viewpoint, they can be inaccurate and/or fail for use in robots that capture images from different viewpoints.

As another example of drawbacks, various approaches rely heavily or exclusively on training examples generated based on data from real-world physical robots, which requires heavy usage of the physical robots in attempting robotic grasps or other manipulations. This can be time-consuming (e.g., actually attempting a large quantity of grasps requires a large quantity of time), can consume a large amount of resources (e.g., power required to operate the robots), can cause wear and tear to the robots being utilized, and/or can require a great deal of human intervention (e.g., to place objects to be grasped, to remedy error conditions).

SUMMARY

This specification is directed generally to methods and apparatus related to robotic visual servoing. More particularly, various implementations are directed to techniques for training and/or using a recurrent neural network model for visual servoing of an end effector of a robot. In visual servoing, the recurrent neural network model can be utilized to generate, at each of a plurality of time steps, an action prediction that represents a prediction of how the end effector should be moved (e.g., a direction of movement) to cause the end effector to move toward a target object. For example, the action prediction can indicate a three-dimensional (3D) (e.g., "X,Y,Z") velocity for traversing of the end effector. At each time step, the prediction can be based on processing, using the recurrent neural network model, of a query image that captures the target object (e.g., a cropped or zoomed image that is focused on the target object), a current scene image for that time step (that includes the target object, the end effector of the robot, and optionally additional scene objects), and a previous action representation that represents an action prediction of a previous time step. The previous action representation may be the neural network model's internal representation of the action prediction of the previous time step. At an initial time step, the previous action representation can be a "null" action prediction (indicating no action), or can be based on an action previously implemented without reference to an action prediction generated using the recurrent neural network model.

The recurrent neural network model is recurrent in that it includes at least one recurrent layer that includes a plurality of memory units such as long short-term memory ("LSTM") units and/or gated recurrent units ("GRU"). Such recurrent layer(s) enable the recurrent neural network model to maintain a "memory" of previous actions and previous scene images and to adapt action predictions in view of such previous actions and scene images, such that the end effector is servoed toward the target object over multiple time steps. This can also enable the recurrent neural network model to be robust to various viewpoints of vision sensors (e.g., cameras) that capture the images processed using the recurrent neural network model, as the "memory" of the recurrent layer(s) enables effective observation of the result(s) of previous action(s) and appropriate adaptation of future predicted actions. Accordingly, the recurrent neural network model can be utilized across a variety of robots having vision components at a variety of viewpoints and/or can be utilized for a single robot even when a viewpoint, of a vision component of the robot, is drastically altered (between servoing episodes or even during a servoing episode).

In many implementations, the recurrent neural network model can be trained utilizing simulated data generated based on simulated robot(s) interacting in simulated environments. The simulated data is generated by one or more simulators each executing on one or more computing devices, as those simulators are utilized to simulate the robot(s), the simulated environments, and the simulated actions of the robot(s) within the simulated environment(s). As described herein, reinforcement learning can be utilized to train the recurrent neural network model and the simulated data can be generated based on simulated control of the simulated robot in the simulated environment, where the simulated control is based on action predictions generated by the recurrent neural network model during training.

Use of the simulator(s) can enable the rendering of images, using the simulator(s), from various viewpoints across training episodes, thereby increasing the robustness and/or accuracy of the trained recurrent neural network model for multiple viewpoints (including viewpoints not seen during training). Use of the simulator(s) can additionally or alternatively enable efficient variance of target objects and environmental objects across training episodes, thereby increasing the robustness and/or accuracy of the trained recurrent neural network model for multiple scenes (including scenes not seen during training). Further, use of the simulator(s) can additionally or alternatively enable efficient determination of one or more rewards used to update the recurrent neural network during training, such as shaped rewards and/or sparse rewards, corresponding instances of which can optionally be applied at every step during a training episode. For example, a shaped reward can be determined at each time step based on comparison of (e.g. Euclidean distance between) a direction indicated by an action prediction of the time step and a "ground truth" direction to the target object. The ground truth direction to the target object can be efficiently determined at each time step as the pose of a simulated target object is known by the simulator. Yet further, use of the simulator(s) can additionally or alternatively enable acceleration of learning of a policy represented by the recurrent neural network model through the use of demonstrations that are each based on corresponding optimal directions (optionally perturbed for robustness) toward a corresponding target object, which can be determined based on corresponding known poses of the simulated robot and the simulated target object.

In addition, use of simulated data can lead to various efficiencies as compared to use of real world data generated based on operation of real physical robots. For example, simulated episodes can each be performed in less time than a corresponding real-world grasp episode and/or can be performed in parallel over multiple (e.g., hundreds of, thousands of) computing devices and/or processors, further increasing the time efficiency of the simulated episodes. These and other considerations can lead to consumption of less resources (e.g., a simulated episode can consume less power than a corresponding real-grasp episode), can lead to less wear and tear on physical robots (e.g., due to reduction in the quantity of the real-world episodes), and/or can require less human intervention (e.g., less oversight of the real-world episodes).

In various implementations, one or more portions of a recurrent neural network model, trained based on simulated data, are further trained based on real world data to adapt the recurrent neural network model for improved performance when utilized on real physical robots. For example, the recurrent neural network model can include a visual portion that is utilized to process a query image and a corresponding scene image at each time step. The visual portion can be adapted through further training that is based on training examples that each include a real query image and a corresponding real scene image as training example input. The training examples can each further include a training example output that is independent of action prediction. For example, the training example output of a training example can be a manually labeled one hot vector where the "hot" values indicate location(s) in the real scene image where the object of the corresponding real query image is present. The training example inputs can be processed using the visual portion, and optionally one or more additional layer(s) (e.g., affine layers) used in the real-world adaptation (and not used in visual servoing), errors determined based on comparisons of generated predicted outputs and the training example outputs, and the errors used to update the visual portions (e.g., through back propagation). In this manner, the visual portion can be further trained based on real training examples to make the recurrent neural network model more robust and/or accurate when employed in visual servoing by real physical robots. In various implementations, the visual portion of the recurrent neural network model can be updated based on real training examples, without updating of other portions of the recurrent neural network model, such as action portion(s) and/or policy portion(s).

The above description is provided as an overview of some implementations of the present disclosure. Further description of those implementations, and other implementations, are described in more detail below.

In some implementations, a method of servoing an end effector of a robot is provided and includes determining a query image that captures a target object to be interacted with by an end effector of the robot. The method further includes generating an action prediction based on processing the query image, a scene image, and a previous action representation using a neural network model. The scene image is captured by a vision component associated with the robot and captures the target object and the end effector of the robot. The neural network model used in the processing includes one or more recurrent layers each including a plurality of memory units. The method further includes controlling the end effector of the robot based on the action prediction. The method can further include generating an additional action prediction immediately subsequent to generating the action prediction (but subsequent to controlling the end effector based on the action prediction), and controlling the end effector of the robot based on the additional action prediction. The immediately subsequent action prediction can be generated based on processing the query image, an additional scene image, and the action prediction using the neural network model. The additional scene image can be captured by the vision component after controlling the end effector based on the action prediction and captures the target object and the end effector.

These and other implementations of the technology can include one or more of the following features.

In some implementations, generating the action prediction based on processing the query image, the scene image, and the previous action representation using the neural network model includes: processing the query image and the scene image using a plurality of visual layers of a visual portion of the neural network model to generate visual layers output; processing the previous action representation using one or more action layers of an action portion of the neural network model to generate action output; combining the visual layers output and the action output; and processing the combined visual layers output and action output using a plurality of policy layers of the neural network model. In those implementations, the policy layers include the one or more recurrent layers. In some of those implementations, the plurality of memory units of the one or more recurrent layers include long short-term memory units. In some of those implementations, processing the query image and the scene image using the plurality of visual layers of the visual portion of the neural network model to generate visual layers output includes: processing the query image over a first convolutional neural network portion of the visual layers to generate a query image embedding; processing the scene image over a second convolutional neural network portion of the visual layers to generate a scene image embedding; and generating the visual layers output based on the query image embedding and the scene image embedding. Generating the visual layers output based on the query image embedding and the scene image embedding can include processing the query image embedding and the scene image embedding over one or more additional layers of the visual layers.

In some implementations, the action prediction represents a velocity vector for displacement of the end effector in a robot frame of the robot.

In some implementations, determining the query image is based on user interface input from a user. In some versions of those implementations, the user interface input is typed or spoken user interface input, and determining the query image based on the user interface input includes selecting the query image, from a plurality of stock images, based on data, associated with the selected query image, matching one or more terms determined based on the user interface input. In some other versions of those implementations, determining the query image based on user interface input includes: causing the scene image or a previous scene image to be presented to the user via a computing device; and generating the query image based on a crop of the scene image or the previous scene image, where the crop is determined based on the user interface input, and where the user interface input is received via the computing device and indicates a subset of the presented scene image or previous scene image. In some implementations, the query image is generated based on an image captured by the vision component of the robot.

In some implementations, the query image, the scene image, and the additional scene image are each two dimensional images or are each two and a half dimensional images.

In some implementations, a method of training a neural network model for use in servoing of an end effector of a robot is provided. The method of training includes, for each of a plurality of simulated episodes performed using a robot simulator: determining a rendered query image rendered by the robot simulator. The rendered query image captures a corresponding simulated target object, of a corresponding simulated environment of the robot simulator. The method further includes, for each of a plurality of instances, for each of the simulated episodes, and until one or more conditions are satisfied: generating an action prediction, generating a reward for the instance based on the action prediction and based at least in part on ground truth data from the robot simulator, updating at least part of the neural network model based on the reward, and causing the robot simulator to control the simulated end effector of the simulated robot based on the action prediction prior to a next instance of the instances. Generating the action prediction can be based on processing the rendered query image, a rendered scene image for the instance, and a previous action representation for the instance using a neural network model. The rendered scene image for the instance can be rendered using the robot simulator and can capture the simulated target object and the simulated end effector of the simulated robot after any prior instance of the instances. The previous action representation can be based on an immediately preceding action prediction of any prior instance of the instances, and the neural network model can include one or more recurrent layers each including a plurality of memory units.

These and other implementations of the technology can include one or more of the following features.

In some implementations, the neural network model includes a visual portion that is utilized in processing of the rendered query images and the rendered scene images of the instances of the episodes. In some of those implementations, the method further includes further training the visual portion utilizing real images. Further training the real portion of the real images can include generating losses, during the further training, that are each based on a respective supervised label for a respective one of the real images. The supervised label can be for a task that is distinct from an end effector servoing task. For example, the task that is distinct from the end effector servoing task can be an object localization task.

In some implementations, generating a reward for the instance based on the action prediction and based at least in part on ground truth data from the robot simulator includes: generating a ground truth action prediction based on the ground truth data; and generating the reward based on comparison of the action prediction and the ground truth action prediction. In some of those implementations, the ground truth data includes a pose of the simulated end effector for the instance and a pose of the simulated target object for the instance, and generating the ground truth action prediction based on the ground truth data includes: generating the ground truth action prediction based on the ground truth action causing movement of the simulated end effector toward the simulated target object.

In some implementations, generating a reward for the instance is further based on whether the simulated episode results in the simulated end effector successfully reaching the simulated target object.

In some implementations, the method further includes, for each of a plurality of prior simulated episodes performed, using the robot simulator, prior to the plurality of simulated episodes: selecting particular action predictions, for simulated implementation in generating rewards, based on the particular action predictions being based on respective optimal directions toward respective target objects, as determined based on simulated data from the simulator. In some of those implementations, one or more of the particular action predictions are based on the respective optimal directions, with injected noise. The injected noise can be normal Gaussian noise.

In some implementations the neural network model includes a visual portion that is utilized in processing of the rendered query images and the rendered scene images of the instances of the episodes, and the method further includes: identifying a real training example, generating predicted output based on processing of the real training example input using the visual portion, determining an error based on the predicted output and the training example output; and updating the visual portion based on the error. In some of those implementations, the real training example includes training example input and training example output. The training example input can include, for example, a real query image and a real scene image, where the real query image is captured by a real vision sensor and captures a real target object, and the real scene image is captured by the real vision sensor, or an additional real vision sensor, and captures the real target object and one or more additional objects in a real scene. In some of those implementations, updating the visual portion based on the error occurs subsequent to satisfaction of the one or more conditions. In some version of those implementations, the method further includes, subsequent to updating the visual portion, providing the neural network model for use in visual servoing by one or more real physical robots. Optionally, only the visual portion of the neural network model is trained based on real training examples prior to providing the neural network model for use in visual servoing by the one or more real physical robots.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers and/or one or more robots that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
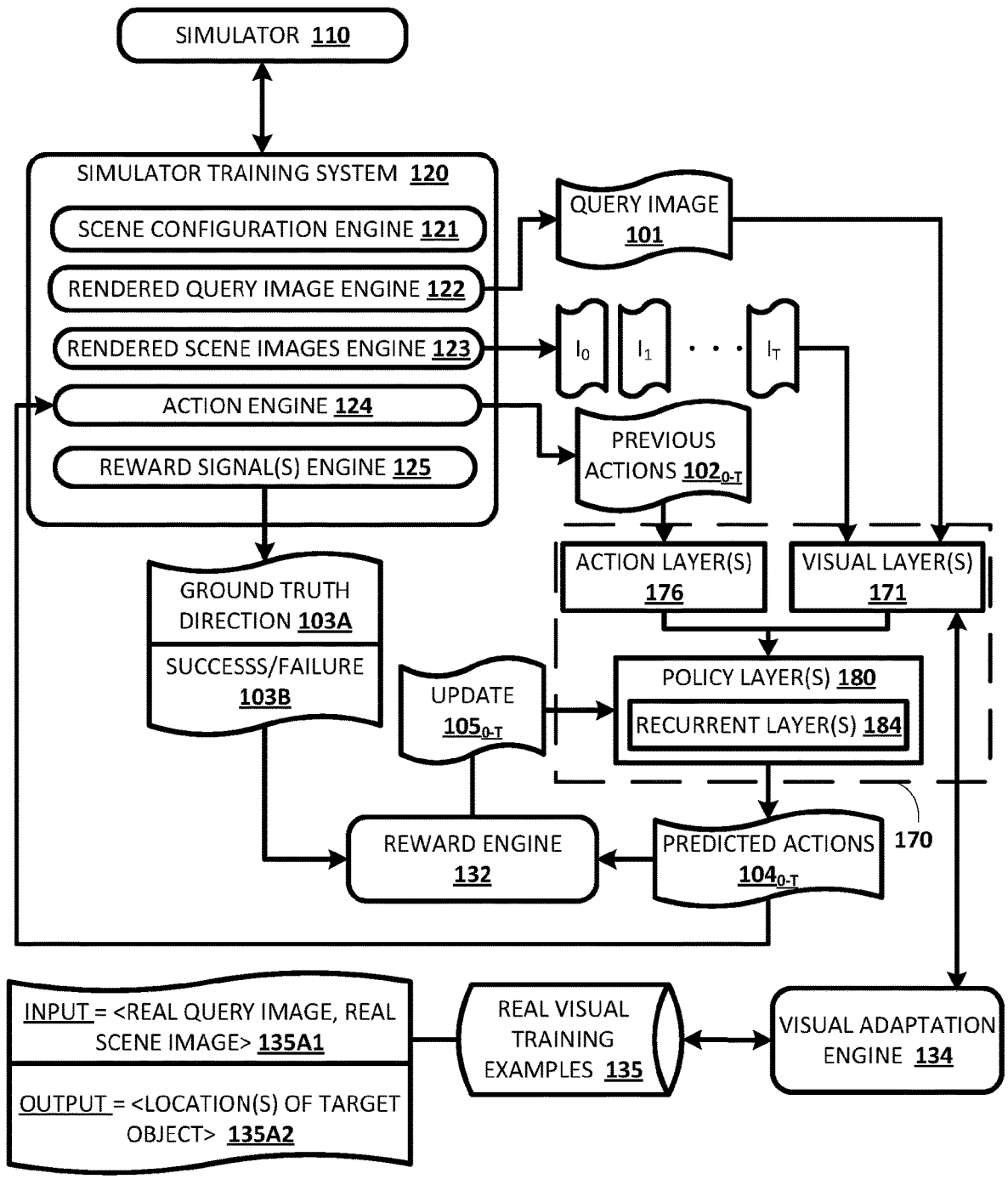
FIG. 1 illustrates an example environment in which a recurrent neural network model can be trained for use in viewpoint invariant visual servoing of an end effector of a robot.

Implementations described herein train and utilize a recurrent neural network model that, at each time step, can be utilized to: process a query image of a target object, a current scene image that includes the target object and an end effector of a robot, and a previous action prediction; and generate, based on the processing, a predicted action that indicates a prediction of how to control the end effector to move the end to the target object. The recurrent neural network model can be viewpoint invariant in that it can be utilized across a variety of robots having vision components at a variety of viewpoints and/or can be utilized for a single robot even when a viewpoint, of a vision component of the robot, is drastically altered. Moreover, the recurrent neural network model can be trained based on a large quantity of simulated data that is based on simulator(s) performing simulated episode(s) in view of the recurrent neural network model. One or more portions of the recurrent neural network model can optionally be further trained based on a relatively smaller quantity of real training data. For example, a visual portion (and optionally only the visual portion) can be trained based on a small quantity of real training data to adapt the recurrent neural network model to processing of real images captured by vision components of real robots.

Humans are proficient at controlling their limbs and tools from a wide range of viewpoints and angles, even in the presence of optical distortions. For example, most humans can easily perform tasks while seeing themselves in a mirror. In robotics, such skills are typically referred to as visual servoing: moving a tool or end-point to a desired location using primarily visual feedback. Implementations described herein relate to methods and apparatus for automatic learning of viewpoint-independent visual servoing skills in a robotic manipulation scenario. For example, implementations relate to training a deep, recurrent neural network model that can be utilized to automatically determine which actions move the end-point of a robotic arm to a desired object. Such implementations enable use of the recurrent neural network model in determining actions to implement, even under severe variations in viewpoint of images processed using the model. Implementations of the visual servoing system described herein utilize memory of past movements (via recurrent layer(s) of the recurrent neural network model) to understand how actions affect robot motion from a current viewpoint of a vision component being utilized to capture images, correcting mistakes in implemented actions and gradually moving closer to the target. This is in stark contrast to many visual servoing techniques, which either assume known dynamics or involve a calibration phase.

Accordingly, implementations described herein train deep neural networks, augmented with recurrent connections for memory, for use in viewpoint-invariant visual servoing. In classical robotics, visual servoing refers to controlling a robot in order to achieve a positional target in image space, typically specified by positions of hand-designed keypoint features. Implementations disclosed herein take a more open-world approach to visual servoing: the goal is specified by providing the neural network model with a target "query image" of the desired object, and the neural network model is utilized to select the actions that will cause the robot to reach that object, without any manually specified features, and in the presence of severe viewpoint variation. This enables visual servoing techniques that can servo to target objects (e.g., user-chosen via user specification of a query image) so long as a vision component (e.g., camera) associated with the robot can actually see the robot (e.g., the end effector and optionally links controlling the end effector) and the target object. A neural network model trained according to implementations disclosed herein is trained to automatically and implicitly learn to identify how actions affect image-space motion, and can generalize to novel objects not seen during training. The model is trained through synthetic images (e.g., rendered images of a simulated environment and/or simulated robot) and optionally an adaptation procedure that uses weakly labeled real-world videos (sequences of images).

Accordingly, various implementations described herein provide a learned visual servoing mechanism that can servo a robot arm to previously unseen objects. To enable this, some of those implementations utilize a novel recurrent convolutional neural network architecture for learned visual servoing, and/or utilize a novel training procedure that uses strongly labeled synthetic images, combined with a small amount of weakly labeled real-world data. Further, in some of those implementations, an overwhelming majority of training data can be generated in simulation, and only a modest number of videos of real robots (and/or other real world images) are used to adapt the model to the real world through an auxiliary attentional loss. Such transfer method effectively fine-tunes the visual representation to real videos, while keeping the policy/motor control layers of the network fixed.

The action predictions iteratively generated by a recurrent neural network model in visual servoing enables an end effector of a robot to reach a target object, out of several objects, placed on one or more surfaces (e.g., a table). The target object can be specified by a tightly cropped image of this object from an arbitrary view. The object can be specified, for example, based on user interface input from a user (e.g., drawing or otherwise indicating a bounding box for generating the tightly cropped image), or based on output from a higher level task planner (e.g., that indicates "object X" should be traversed to next, and provides a "stock" image of "object X" or a rendered image of "object X" (e.g., rendered based on a model of "object X")). When a target object is reached utilizing the action predictions, the robot end effector can be used to manipulate the target object. For example, the robot end effector can be used to grasp, push, pull, and/or otherwise manipulate the target object.

Servoing techniques described herein adapt control of an end effector based on visual feedback. For example, as the recurrent neural network model is utilized to generate action predictions in an unexplored setup, it observes its own motions in response to implementation of those action predictions and self-calibrates. Thus, the learned policy of the recurrent neural network model can generalize to new setups or deal with changes in the current setup, which in most prior applications is done via tedious calibration procedures. Moreover, the visual robotic system can become aware of its own physical properties without a precise model, which makes such an approach more general than calibration.

The recurrent neural network model can be trained based on varied scene layouts (varied surfaces, varied texture(s) of surfaces, a wide variety of objects) and is trained and configured to understand target object semantics—as it is to reach not for any, but for a specified, target object. As such, the recurrent neural network model performs implicit object localization in 3D. Also, through variation in both target objects and scene objects throughout training, the recurrent neural network model is trained to generalize its policy between different shapes.

Implementations described herein utilize a policy $\pi_\theta$ that is implemented as a deep neural network with parameters $\theta$. This policy outputs an action $\alpha=(\partial_x, \partial_y, \partial_z)$ representing the displacement of the end effector of the arm in the robot frame. It is trained using a reinforcement learning over a finite-horizon discounted Markov Decision Process (MDP) (S, A, P, R, $\gamma$). The observable part of the state space S is an image of the scene and the arm, which at time t is denoted as $o_t$. The action space $A=[-d, d]^3$ is a continuous 3-dimensional space of allowed displacement commends. A shaped reward function used at training time captures the distance between the arm and the target object and is defined via computing the Euclidean distance between the ground truth direction to target object and the predicted direction. In addition to (or instead of) the shaped reward function, a sparse reward function can be used that is based on reach success and failure. Such a sparse reward function can be estimated and assigned to every step during a training episode using multistep rollouts and Monte-Carlo return estimates. As one example, if the distance of the end effector d to the target object is less than a predefined threshold $\tau$, the sparse reward is r=1 and otherwise it is 0. The policy is trained to maximize the expected discounted reward of trajectories T=$o_1, a_1, \ldots, o_T$ sampled from the policy:

$$\theta^* = \mathrm{argmax}_\theta \mathbb{E}_{\tau \sim \pi_\theta}\left(\sum_{t=1}^{T} \gamma^t R(a_t, O_t)\right)$$

A scene image and a query image can be each be embedded to a corresponding embedding vector using a corresponding convolutional neural network (CNN) of the recurrent neural network model. For example, the scene images can be optionally resized (e.g., to 256×256) and embedded using the output of a layer of a CNN, such as the Conv5-3 layer of the VGG16 network. Also, for example, the query image can optionally be resized (e.g., to 32×32) and embedded using VGG16 in a similar fashion.

The visual servoing model is a recurrent neural network model over the sequence of observations and actions $S_{1:t}=(o_1, a_2, \ldots, o_t, a_t)$. The recurrent neural network model includes one or more recurrent layers, such as a single layer LSTM of dimensionality 512. The actions can be embedded to an action vector (e.g., a 64-dimensional vector) using a single layer fully connected network portion with ReLU, and the action embedding can be concatenated with the observation embedding at each time step. The observation embedding at each time step can be based on a concatenation of the query image embedding and the scene image embedding of the time step. It is noted that, during an episode, the query image embedding can stay the same at each time step (the query image remains constant), while the scene image embedding can vary at each time step (as each scene image embedding is based on a new "current" scene image).

The hidden state in the recurrent layer(s) (e.g., LSTM layers) of the recurrent neural network captures the full history of observations in an episode. Thus, it can perform implicit calibration based on observed feedback from the implementation of multiple prior action predictions.

The loss at each time step can be based on the Euclidean distance between the end effector location and target object location after execution of the action. Denoted by $x_t$ the end effector location at step t in the world frame, which can be expressed as $x_t = x_{t-1} + a_{t-1}$, where $a_{t-1}$, is produced by the controller. If the target object location is l in the same world frame, then the loss is:

$$\sum_{t=1}^{T-1}\|x_{t-1} + a_{t-1} - l\|^2$$

To keep action prediction magnitudes within a bound, normalized action direction vectors can be learned and constant velocity can be utilized. That is, the action predictions generated using the recurrent neural network model can be normalized action vectors and can indicate velocity directions, where the velocities are constant velocities (i.e., the directions will vary, but the magnitude of the velocities will be constant)

The view-invariant queried-target reaching task addressed by implementations disclosed herein introduces a hyper dimension to the state-space, and learning an optimal policy for such a complicated task via deep reinforcement learning can be challenging due to sample complexity. Accordingly, some implementations disclosed herein accelerate policy learning by using demonstrations. For example, the optimal direction towards the goal in the simulation can be determined at each of multiple time steps for a demonstration, and the demonstrations can optionally be perturbed. For example, one or more of the demonstrations can be perturbed by injecting normal Gaussian noise to the demonstrations to learn a robust policy.

Assuming that the length of an episode is T, off-policy data can be collected and the reward can be determined for each time step based on multistep Monte-Carlo (MC) policy evaluation. The Monte-Carlo return estimates provide a simplified version of Bellman updates and have the benefit of not having the Bellman updates instabilities. Using these MC return estimates, the recurrent neural network model can be utilized produce a reward value for any candidate action given the current state $v_t = \Sigma_i^H \gamma^i r_{t+1}$.

At run time, a small optimization can be performed on the predicted action $a_t$ produced utilizing the recurrent neural network model. Such optimization can provide better results and improve performance at run time. Various optimizations can be utilized, such as cross-entropy method (CEM) optimization, which is a derivative free optimization method. CEM samples a batch of candidate actions by fitting a Gaussian distribution centered at the predicted action vector $a_t$, and evaluates them according to a value network. The candidate action with highest value will be selected for as the next action to be performed.

Prior to use of the neural network model on a real robot, at least the visual portion of the model can be adapted, optionally leaving the policy/control portion of the model fixed. The visual portion of the model should understand the relevant semantics of the scene pertaining to the task, while at the same time allow for servoing. To ensure that both properties are true, the visual portion of the model can be fine-tuned based on training examples that are based on a related (but distinct) task—such as rough object localization. For example, soft attention can be utilized over the last feature map of the visual portion. The soft attention can be a softmax over all locations in the last feature map, which corresponds to a small set of potential target object locations. The training examples can each include training example input with a real query image of a target object and a real scene image that includes the target object (and additional object(s) and/or a robot end effector), and training example output that is a manual labeling of the true locations (in the real scene image) of the target object. The loss can be determined based on the cross entropy between the true location, represented in the training example output as a one hot vector, and the attention vector, which is a softmax operation over scores for all locations. Accordingly, the network architecture of the neural network model according to implementations described herein provides the flexibility to disentangle perception from control via the auxiliary attention loss. Such flexibility enables adaptation of the visual layers in the fine-tuning.

For training the recurrent neural network model in simulation, a simulator (e.g., the BULLET physics engine) can be utilized, with a simulated robot (e.g., a multi-degree-of-freedom robotic arm) and simulated environment. In the simulated setup, random simulated objects can be randomly placed on one or more surfaces (e.g., a table) in front of the simulated arm. To encourage the model to learn a robust policy invariant to the shape and appearance of the target objects and scene appearances, a diverse set of objects can be utilized and exponentially augment the visual diversity of the environment using texture randomization, lighting randomization, and/or other techniques. Training in such a diverse simulated environment results in learning generalizable policies that can quickly adapt to new test scenarios.

Turning now to the figures, FIG. 1 illustrates an example environment in which a recurrent neural network model can be trained for use in viewpoint invariant visual servoing of an end effector of a robot.

FIG. 1 includes a simulator training system 120, which is implemented by one or more computer systems. The simulator training system 120 interfaces with one or more simulators 110 in generating simulated data for use in training a recurrent neural network model 170. The simulator(s) 110 are also implemented by one or more computer systems, which can be the same and/or different from computer system(s) used to implement the simulator training system 120. The simulator(s) 110 can be used to simulate various environments that include corresponding environmental objects, to simulate a robot operating in the environment, to simulate responses of the robot in response to virtual implementation of various simulated robotic actions, and to simulate interactions between the robot and the environmental objects in response to the simulated robotic actions. Various simulators can be utilized, such as physics engines that simulates collision detection, soft and rigid body dynamics, etc. One non-limiting example of such a simulator is the BULLET physics engine.

The simulator training system 120 includes a scene configuration engine 121, a rendered query image engine 122, a rendered scene images engine 123, an action engine 124, and a reward signal(s) engine 125. The simulator training system 120 causes a large number (e.g., thousands, hundreds of thousands, millions) of simulated episodes to be performed utilizing the simulator(s) 110 and interacts with the recurrent neural network model 170 in performance of such episodes. Each simulated episode can be performed in a corresponding simulated environment with corresponding simulated environmental objects present. The scene configuration engine 121 varies the simulated environment and/or simulated environmental objects among the episodes and selects varied target objects for the episodes. For example, a first set of one or more simulated episodes can occur with 5 simulated plates, 3 simulated forks, 4 simulated cups, and a simulated napkin all resting atop of a simulated table. The starting poses of one or more of the objects can optionally vary between one or more of the episode(s) of the first set, the target object can optionally vary between one or more of the episode(s) of the first set, texture of the table can optionally vary between one or more of the episode(s) of the first set, and/or simulated lighting can optionally vary between one or more of the episodes of the first set. A second set of one or more simulated episodes can occur with 8 simulated forks and 2 simulated cups atop a different simulated surface. Variations between episodes of the second set can likewise occur.

For each simulated episode, a simulated target object in the simulated environment is selected and a rendered query image of the target object is rendered by the rendered query image engine 122. For example, FIG. 1 shows a query image 101 of an object that can be rendered for an episode. The query image 101 can be highly focused on the target object, and can optionally include a background (if any) that conforms to the scene of the episode. The query image 101 can be rendered from the same viewpoint, or a different viewpoint, as the viewpoint utilized in generated rendered scene images for the episode.

Each simulated episode consists of T separate time steps or instances. The rendered scene images engine 123 renders a scene image for each time step, where each rendered scene image is from a corresponding viewpoint and captures the simulated environment at the corresponding time step. For example, each rendered scene image can capture the simulated end effector and/or other simulated robot component(s), the simulated target object, and optionally other simulated environmental object(s) at a corresponding time step. As described herein, the viewpoints used to render the scene images can vary widely across episodes to provide diversity in synthetic training data and robustness of the recurrent neural network model 170 to various viewpoints.

FIG. 1 shows scene images $I_0, I_1, \ldots I_T$ that can be rendered throughout an episode, where each scene image is rendered at a corresponding time step and processed using the recurrent neural network model 170 at a corresponding time step. As described herein, the scene images $I_0, I_1, \ldots I_T$ will vary over time steps as a result of implementation of action predictions generated utilizing the recurrent neural network model 170. The scene images $I_0, I_1, \ldots I_T$ for the given episode can optionally be rendered from the same viewpoint (although different viewpoints can be used for different episodes).

The action engine 124 implements, at each time step of an episode, a corresponding predicted action generated for that time step utilizing the recurrent neural network model 170. For example, the action engine 124 causes the simulator 110 to traverse the simulated end effector of the simulated robot in accordance with the predicted action generated at each time step to thereby cause servoing of the simulated end effector in the simulated environment.

The reward signals engine 125 provides one or more rewards signals to the reward engine 132 for use by the reward engine 132 in determining rewards for use in updating the recurrent neural network model 170 during training. For example, the reward engine 132 can determine a reward at each time step, and update the recurrent neural network model 170 at each time step based on the reward. For example, each update can be a loss that is based on the reward and that is back propagated across one or more (e.g., all) portions of the recurrent neural network model 170 to update parameters of those portion(s). The reward signals provided by the reward signal(s) engine 125 can include, for example, a ground truth direction 103A and/or a success/failure indication 103B—either or both of which can be updated at each time step. For instance, the reward engine 132 can use the ground truth direction 103A to determine a shaped reward at a time step based on comparison of (e.g. Euclidean distance between) a direction indicated by an action prediction of the time step and the ground truth direction 103A provided for the time step. Each ground truth direction indicates a corresponding direction, for the time step, to the target object and can be efficiently determined at each time step based on the pose of the simulated end effector at the time step and based on the pose of the simulated target object at the time step.

At each time step during an episode, a query image, a corresponding scene image, and a corresponding previous action are processed using the recurrent neural network model 170 to generate a predicted action. The predicted action is provided to the action engine 124 for implementation of the predicted action in the simulator 110. Further, a reward is determined by the reward engine 132 and utilized to update the recurrent neural network model 170. For example, as illustrate in FIG. 1 at each time step of a given episode the query image 101 and a corresponding one of the scene images $I_0, I_1, \ldots I_T$ can be processed over visual layer(s) 171 of the model 170 to generate visual output (i.e., an embedding). Further, a corresponding one of the previous actions $102_{0-T}$ (i.e., the most recently generated action prediction) can be processed over action layer(s) 172 of the model to generate action output (i.e., an embedding). The visual output and the action output can be concatenated and processed over policy layer(s) 180 of the model 170, including recurrent layer(s) 184 to generate a corresponding one of the predicted actions $104_{0-T}$. The corresponding one of the predicted actions $104_{0-T}$ is provided to the action engine 124 for implementation in the simulator 110, and is provided to the reward engine 132. The reward engine 132 utilizes the corresponding one of the predicted actions $104_{0-T}$, along with a corresponding ground truth direction 103A and/or success/failure indication 103B to determine a reward, and to provide a corresponding update $105_{0-T}$ to the recurrent neural network model 170. This can be repeated for each time step of the episode, and further repeated for each of a large quantity of episodes to train the recurrent neural network model 170.

Also illustrated in FIG. 1 is a visual adaptation engine 134 that can be utilized to further train at least (and optionally only) the visual layer(s) 171 based on real training examples 135, prior to deployment of the recurrent neural network model 170 in one or more physical robots. One example of one of the training examples 135 is illustrated in FIG. 1 and includes training example input 135A1 that includes a real query image and a real scene image, and training example output 135A2 that includes an indication of location(s) of the target object (of the real query image of the training example input 135A1) in the real scene image of the training example input 135A1. For example, the training example output 135A2 can be a one hot vector where the "hot" value(s) indicate location(s) in the real scene image of the training example input 135A1 where the object of the corresponding real query image of the training example input 135A1 is present. The visual adaptation engine 134 can process the training example input 135A1 using the visual layer(s) 171, and optionally one or more additional layer(s) (e.g., affine layers) used in the real-world adaptation (and not used in visual servoing), determine an error based on comparisons of generated predicted outputs and the training example output 135A2, and the error used to update the visual layer(s) 171 (e.g., through back propagation). In this manner, the visual portion can be further trained based on real training examples to make the recurrent neural network model more robust and/or accurate when employed in visual servoing by real physical robots.

Figure 2:
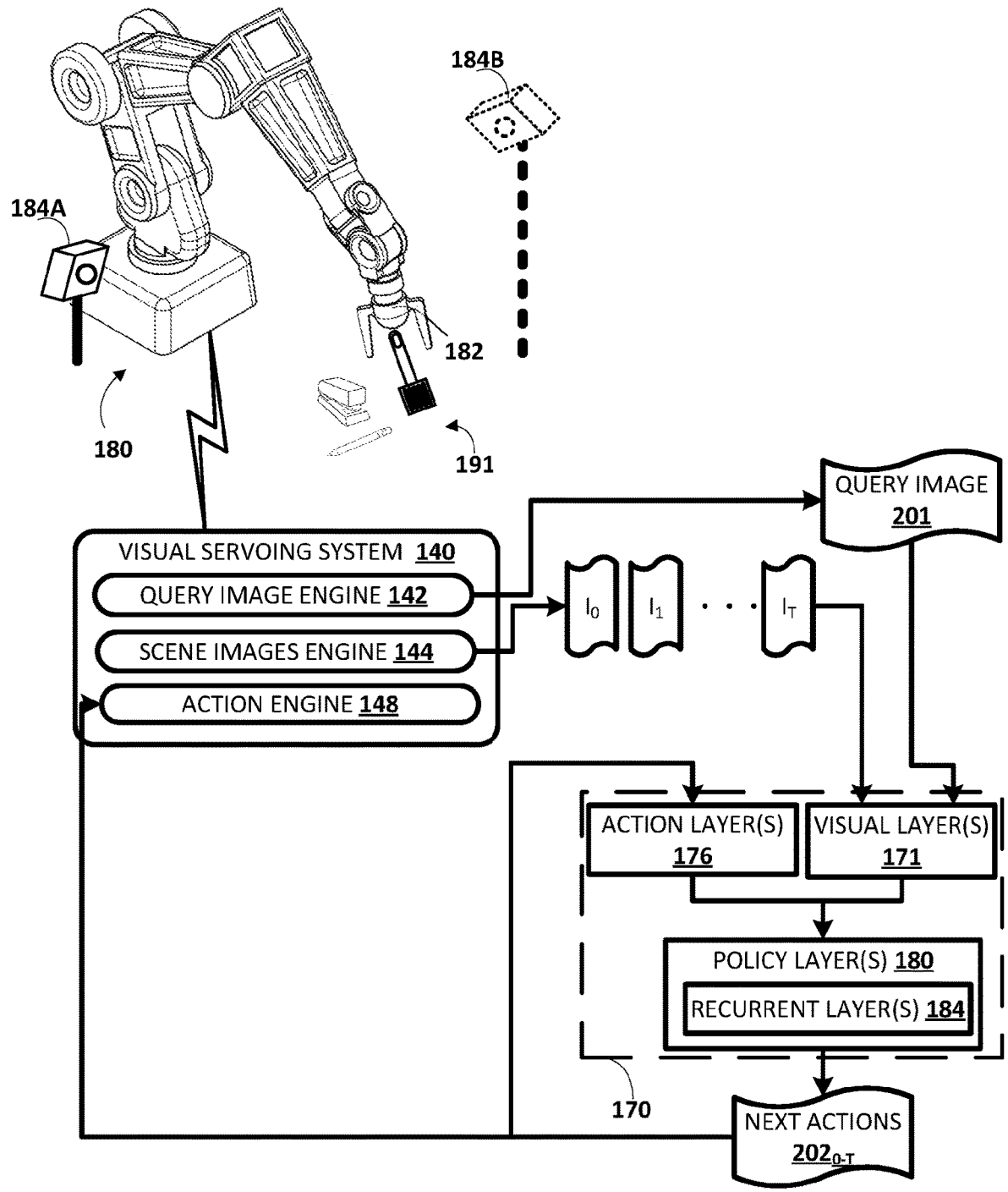
FIG. 2 illustrates an example real physical robot and use of the recurrent neural network model by the robot in performing visual servoing of an end effector of the robot.

FIG. 2 illustrates an example real physical robot 180 and an example of using the recurrent neural network model 170 in performing visual servoing of an end effector 182 of the robot 180. The visual servoing system 140 can be utilized in performing the visual servoing and can, for example, be implemented by one or more processors of the robot 180. The robot 180 can be the same and/or similar to a simulated robot simulated by the robot simulator 110 in FIG. 1. Robot 180 is a "robot arm" having multiple degrees of freedom (e.g., one at each actuator) to enable traversal of grasping end effector 182 along any of a plurality of potential paths to position the grasping end effector 182 in desired locations. Robot 180 further controls two opposed "claws" of grasping end effector 182 to actuate the claws between at least an open position and a closed position (and/or optionally a plurality of "partially closed" positions).

Example vision component 184A is also illustrated in FIG. 2 and images from the vision component 184A are applied to the recurrent neural network model 170 in visual servoing. In FIG. 2, vision component 184A is provide at a first fixed viewpoint. Vision component 184B is also illustrated in FIG. 2 in dashed lines, and is at a very different viewpoint relative to vision component 184A. Vision component 184B is provided to illustrate that visual servoing could still be effectively performed, due to the viewpoint-invariant nature of the model 170, even if the vision component 184B was utilized in lieu of the vision component 184A. Vision component 184A generates images related to shape, color, depth, and/or other features of object(s) that are in the line of sight of the sensors. The vision component 184A can be, for example, a monographic camera (e.g., generating 2D RGB images), a stereographic camera (e.g., generating 2.5D RGB images), and/or a laser scanner (e.g., generating a 2.5D "point cloud" images). It is understood that the rendered images of the simulated data (FIG. 1) will be rendered to be of the same type as the images generated by the vision component 184A. For example, both may be 2.5D RGBD images. It is also understood that a vision component can alternatively be coupled to the robot 180 directly. For example, a vision component can be coupled to a link of the robot 180, such as a link that is upstream from the end effector 182. Further, it is understood that vision component 184A, vision component 184B, and/or a vision component coupled directly to the robot 180, can optionally be independently adjusted (e.g., it can be independently panned, tilted, and/or zoomed).

The vision component 184A has a field of view of at least a portion of the workspace of the robot 180, such as the portion of the workspace that includes example objects 191. Although resting surface(s) for objects 191 are not illustrated in FIG. 2, those objects may rest on a table, a tray, and/or other surface(s). Objects 191 include a spatula, a stapler, and a pencil—and can optionally vary from simulated objects utilized in training the recurrent neural network model 170. Although a particular robot 180 is illustrated in FIG. 2, additional and/or alternative robots may be utilized (physical and/or simulated), including additional robot arms that are similar to robot 180, robots having other robot arm forms, robots having a humanoid form, robots having an animal form, robots that move via one or more wheels, an unmanned aerial vehicle ("UAV"), and so forth. Also, although a particular grasping end effector 182 is illustrated in FIG. 2, additional and/or alternative end effectors may be utilized (physical and/or simulated), such as alternative impactive grasping end effectors (e.g., those with grasping "plates", those with more or fewer "digits"/"claws"), "ingressive" grasping end effectors, "astrictive" grasping end effectors, or "contigutive" grasping end effectors, or non-grasping end effectors.

In FIG. 2, the query image engine 142 determines a query image 201 of a target object. The query image 201 can be determined, for example, based on user interface input from a user (e.g., the query image can be a tightly cropped image that is cropped based on a bounding box drawn or otherwise indicated by a user via user interface input of the user at a computing device displaying an image captured by vision component 184A), or based on output from a higher level task planner. The query image 201 can optionally be based on an image captured by the camera 184A, or can be based on an image from a separate camera, or even a "stock" image. As one example, the query image 201 can be a stock image based on spoken or typed user interface input of a user that specifies one or more semantic properties of a target object, by determining a stock image that matches those one or more semantic properties. For instance, in response to spoken user interface input of "grab the stapler", a stock image can be selected as the query image 201 based on that stock image being indexed by the term "stapler", or otherwise associated with the term "stapler". As another example, the query image 201 can be a stock image based on a higher level task planner specifying one or more semantic properties of a target object, by determining a stock image that matches those one or more semantic properties. At each time step, the scene images engine 144 provides a corresponding current one of the scene images $I_0, I_1, \ldots I_T$ for that time step, where each current scene image is captured by the camera 184A at the corresponding time step.

At each time step, the visual servoing system 140 processes the query image 201 and a corresponding one of the scene images $I_0, I_1, \ldots I_T$ over the recurrent neural network model, along with a corresponding preceding one of the next actions $202_{0-T}$ (if any), to generate a corresponding one of the next actions $202_{0-T}$. The corresponding one of the next actions $202_{0-T}$ is provided to the action engine 148 which generates and provides control commands to one or more actuators of the robot 180 to cause the end effector 182 to move in conformance with the action. This is iteratively performed to generate a new next action at each time step (based on the query image, the previous next action, and the current scene image) thereby servoing the end effector 182 toward a target object indicated by the query image 201, over multiple time steps. Once the target object is reached, the target object can optionally be grasped or otherwise manipulated.

Although not illustrated in FIG. 2, in many implementations a reward engine can be utilized during servoing episodes and can be utilized to continue to generate rewards for further training of the model during servoing episodes (e.g., based on Monte-Carlo based techniques described herein).

Figure 3:
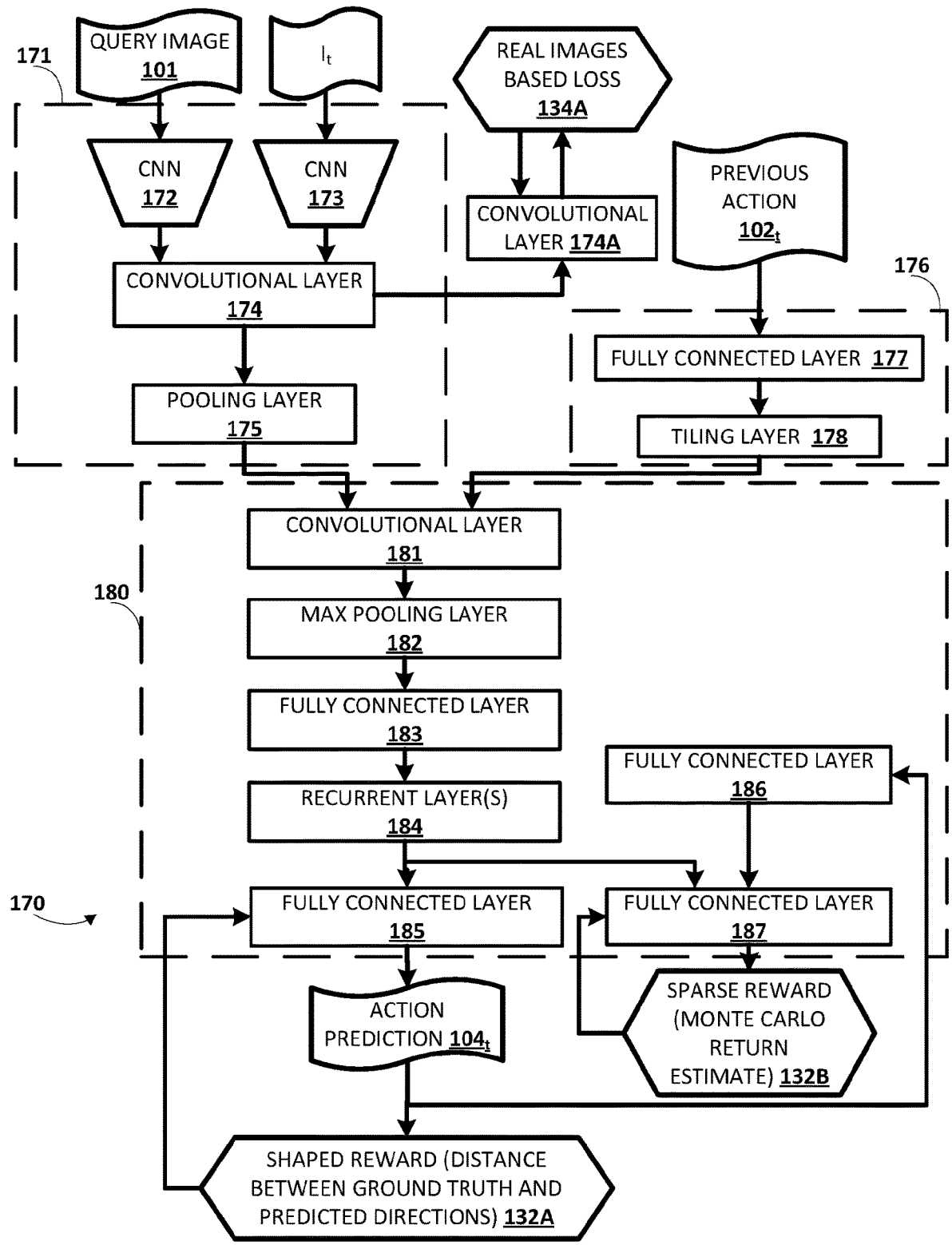
FIG. 3 illustrates one example of the recurrent neural network model of FIGS. 1 and 2.

FIG. 3 illustrates one example of the recurrent neural network model 170 of FIGS. 1 and 2. In FIG. 3, a query image 101 and a scene image $I_t$ are processed over visual layers 171. In particular, the query image 101 is processed over a first CNN 172 of the visual layers and the scene image $I_t$ is processed over a second CNN 173 of the visual layers 171. The output generated based on the processing over the CNNs 172 and 173 is processed over a convolutional layer 174, and output from the processing over the convolutional layer 174 is processed over the pooling layer 175.

The output from the processing over the pooling layer 175 is applied to the policy layers 180. The output from the processing over the pooling layer 175 is applied to the policy layers 180 along with output from the action layers 176. The output from the action layers is generated based on processing of a previous action $102_t$ (e.g., a predicted action from an immediately prior time step) over a fully connected layer 177 and a tiling layer 178 of the action layers 176.

The output from the processing over the pooling layer 175 and the output from the action layers 176 are processed over a convolutional layer 181, max pooling layer 182, fully connected layer 183, and recurrent layer(s) 184 of the policy layers 180. Output generated over the policy layers 180 is processed over a fully connected layer 185 to generate an action prediction $104_t$. The action prediction $104_t$ is also processed using a fully connected layer 186 of the policy layers 180, and output from that processing is processed over another fully connected layer 187, along with output from the recurrent layer(s) 184.

As indicated by 132A, a shaped reward is determined based on the action prediction $104_t$ and a ground truth direction (see e.g., FIG. 1). For example, the shaped reward can be based on a distance between the direction indicated by the action prediction $104_t$ and the ground truth direction.

The shaped reward is applied (e.g., as a back propagated loss) to update the recurrent neural network 170.

As indicated by 132B, a sparse reward is also determined based on the output generated based on the processing over the fully connected layer 187. The sparse reward can be generated based on a MC return estimate as described herein, and can also be applied (e.g., as a back propagated loss) to update the recurrent neural network 170. The rewards indicated by 132A and 132B can be applied by the reward engine 132 (FIG. 1).

Also illustrated in FIG. 3 is a convolutional layer 174A that is not used in visual servoing, but can be used to adapt the convolutional layer 174 and CNNs 172 and 173 based on real training examples as described herein (e.g., after training based on simulated data). This is illustrated in FIG. 3 as real image based loss 134A which can be determined by the visual adaptation engine 134 (FIG. 1) based on processing of a real training example input over the CNNs 172 and 173 and the convolutional layers 174, 174A to generate a predicted output, and comparison of the predicted output to a real training example output.

Figure 4:
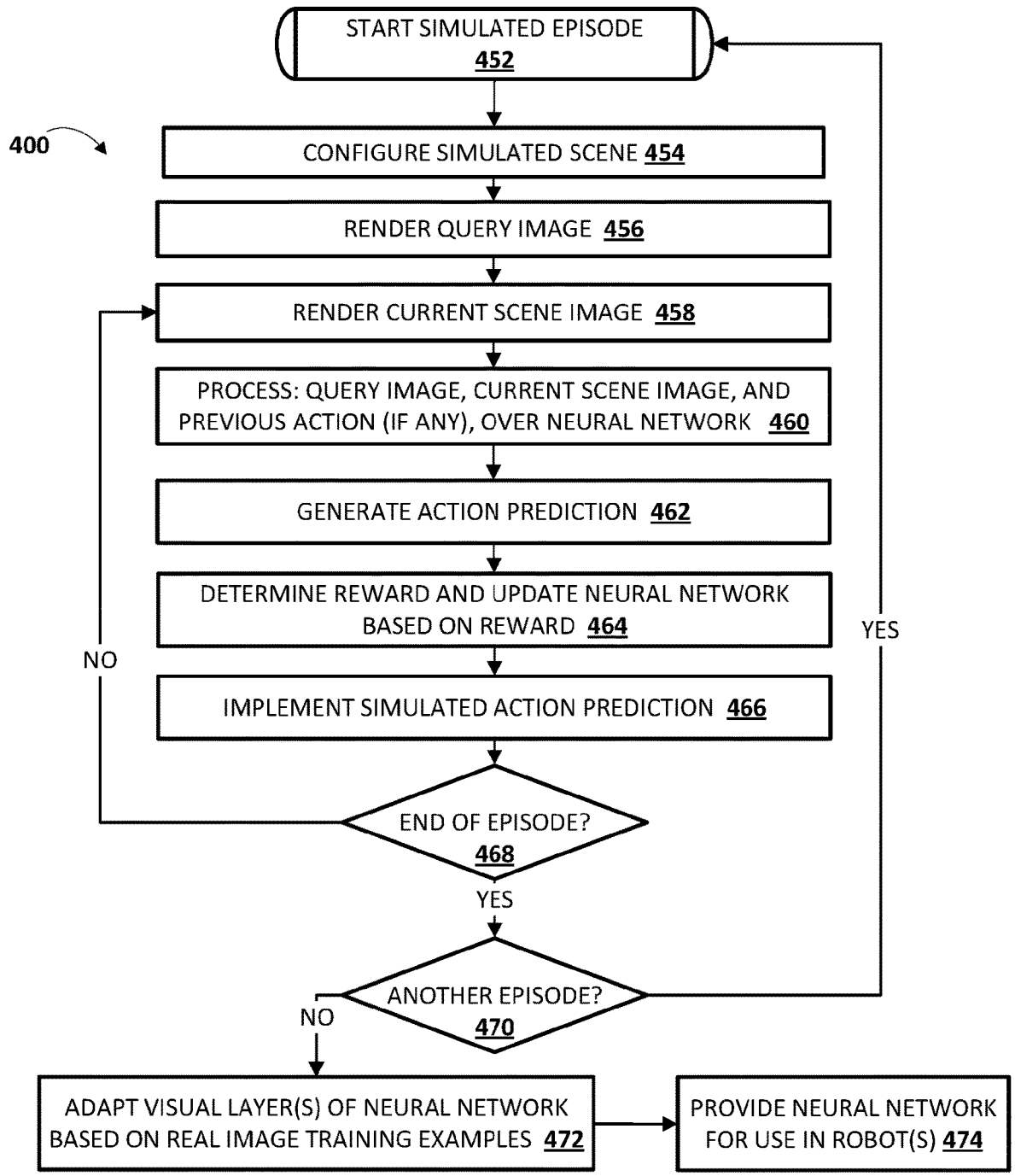
FIG. 4 is a flowchart illustrating an example method of training a recurrent neural network model for use in viewpoint invariant visual servoing of an end effector of a robot.

FIG. 4 is a flowchart illustrating an example method 400 of training a recurrent neural network model for use in viewpoint invariant visual servoing of an end effector of a robot. For convenience, the operations of the method 400 are described with reference to a system that performs the operations. The system can include one or more components of a computing system. While the operations of the flowchart are shown in a particular order, this is not meant to be limiting. One or more operations may be reordered, omitted or added.

At 452 a simulated episode starts.

At step 454, the system configures a simulated scene, in a simulator, for the simulated episode.

At step 456, the system renders a query image for the simulated episode. The query image is of a simulated target object in the simulated scene.

At step 458, the system renders a current scene image for a current time step of the simulated episode, based on a current state of the simulated scene and simulated robot simulated by the simulator. The current scene image captures at least an end effector of the simulated robot and the simulated target object.

At step 460, the system processes the query image, the current scene image, and a previous action (if any), over a recurrent neural network model.

At step 462, the system generates an action prediction based on the processing of step 460.

At step 464, the system determines a reward and updates the recurrent neural network model based on the reward.

At step 466, the system implements a simulated action prediction in the simulator.

At step 468, the system determines whether the end of the episode has been reached. This can be based on a threshold quantity of instances being performed, passage of a threshold quantity of time, and/or determining that the simulated end effector has reached the simulated target object (e.g., based on feedback from the simulator).

If, at an iteration of step 468, the system determines the end of the episode has not been reached, the system proceeds back to 458 and renders another current scene image (which will reflect the implementation of the action prediction at a prior iteration of step 466), then performs another iteration of blocks 460, 462, 464, 466, and 468.

If, at an iteration of step 468, the system determines the end of the episode has been reached, the system proceeds to step 470.

At step 470, the system determines whether to perform another episode. This can be based on a threshold quantity of episodes being performed, passage of a threshold quantity of time, and/or otherwise determining that the recurrent neural network model is sufficiently trained.

If, at an iteration of step 470, the system determines to perform another episode, the system proceeds to 452, and starts another simulated episode.

If, at an iteration of step 470, the system determines not to perform another episode, the system proceeds to step 472.

At step 472, the system adapts visual layer(s) of the recurrent neural network based on real image training examples. The system then proceeds to block 474 and provides the adapted recurrent neural network for use by one or more robots in visual servoing.

Figure 5:
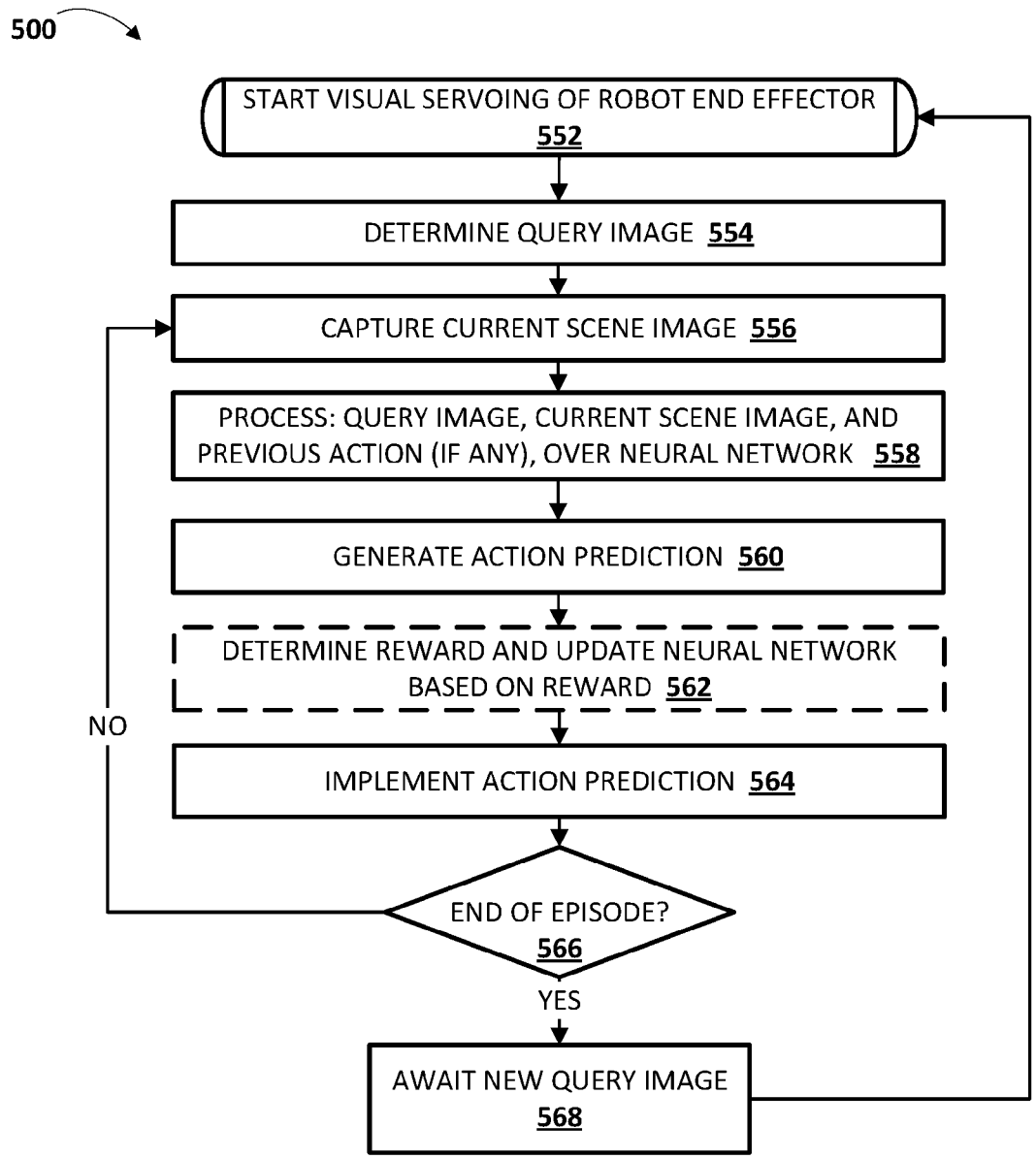
FIG. 5 is a flowchart illustrating an example method of using a recurrent neural network model in performing visual servoing of an end effector of the robot.

FIG. 5 is a flowchart illustrating an example method 500 of using a recurrent neural network model in performing visual servoing of an end effector of the robot. For convenience, the operations of the method 500 are described with reference to a system that performs the operations. The system can include one or more processors of a robot. While the operations of the flowchart are shown in a particular order, this is not meant to be limiting. One or more operations may be reordered, omitted or added.

At 552 visual servoing of a robot end effector starts.

At step 554, the system determines a query image. The query image is of a target object. The query image is used to indicate or identify the target object. Determining the query image may include retrieving an image of the target object (e.g. by selecting an image from a corpus of images, by cropping an image captured by a vision component (e.g. a camera) associated with the robot to produce an image of the target object, or by any other suitable technique).

At step 556, the system captures a current scene image using a camera associated with the robot. The current scene image captures at least an end effector of the robot and the target object.

At step 558, the system processes the query image, the current scene image, and a previous action (if any), over a recurrent neural network model.

At step 560, the system generates an action prediction based on the processing of step 558.

At optional step 562, the system determines a reward and updates the recurrent neural network model based on the reward.

At step 564, the system implements the action prediction by controlling the end effector of the robot based on the action prediction. For example, the system can provide control commands to one or more actuators of the robot, that control the position of the end effector, to cause the end effector to move in conformance with the action prediction.

At step 566, the system determines whether the end of the episode has been reached. This can be based on a threshold quantity of instances being performed, passage of a threshold quantity of time, and/or determining that the end effector has reached the target object (e.g., based on an action prediction at a most recent iteration of step 560 indicating little or no further movement of the end effector is needed to reach the target object).

If, at an iteration of step 566, the system determines the end of the episode has not been reached, the system proceeds back to 556 and captures another current scene image (which will reflect the implementation of the action prediction at a prior iteration of step 564), then performs another iteration of blocks 558, 560, optionally 562, 564, and 566.

If, at an iteration of step 568, the system determines the end of the episode has been reached, the system proceeds to block 568 and awaits a new query image for a new target object. When a new query image for a new target object is received, the system proceeds back to 552 and again performs visual servoing, this time based on the new query image.

Figure 6:
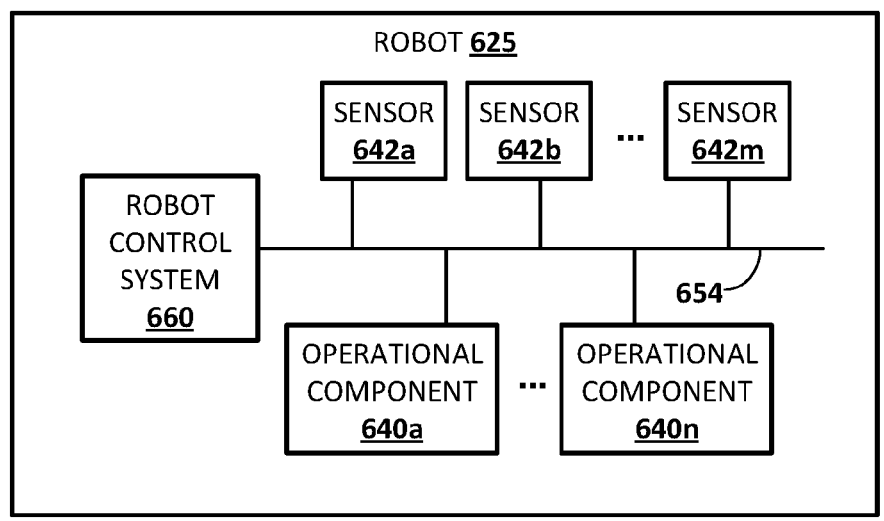
FIG. 6 schematically depicts an example architecture of a robot.

FIG. 6 schematically depicts an example architecture of a robot 625. The robot 625 includes a robot control system 660, one or more operational components 625a-625n, and one or more sensors 642a-642m. The sensors 642a-642m may include, for example, vision components, light sensors, pressure sensors, pressure wave sensors (e.g., microphones), proximity sensors, accelerometers, gyroscopes, thermometers, barometers, and so forth. While sensors 642a-m are depicted as being integral with robot 625, this is not meant to be limiting. In some implementations, sensors 642a-m may be located external to robot 625, e.g., as standalone units.

Operational components 625a-625n may include, for example, one or more end effectors and/or one or more servo motors or other actuators to effectuate movement of one or more components of the robot. For example, the robot 625 may have multiple degrees of freedom and each of the actuators may control actuation of the robot 625 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The robot control system 660 may be implemented in one or more processors, such as a CPU, GPU, and/or other controller(s) of the robot 625. In some implementations, the robot 625 may comprise a "brain box" that may include all or aspects of the control system 660. For example, the brain box may provide real time bursts of data to the operational components 625a-n, with each of the real time bursts comprising a set of one or more control commands that dictate, inter alia, the parameters of motion (if any) for each of one or more of the operational components 625a-n. In some implementations, the robot control system 660 may perform one or more aspects of one or more methods described herein.

As described herein, in some implementations all or aspects of the control commands generated by control system 660 in servoing an end effector can be based on predicted actions generated utilizing a recurrent neural network model as described herein. Although control system 660 is illustrated in FIG. 6 as an integral part of the robot 625, in some implementations, all or aspects of the control system 660 may be implemented in a component that is separate from, but in communication with, robot 625. For example, all or aspects of control system 660 may be implemented on one or more computing devices that are in wired and/or wireless communication with the robot 625, such as computing device 710.

Figure 7:
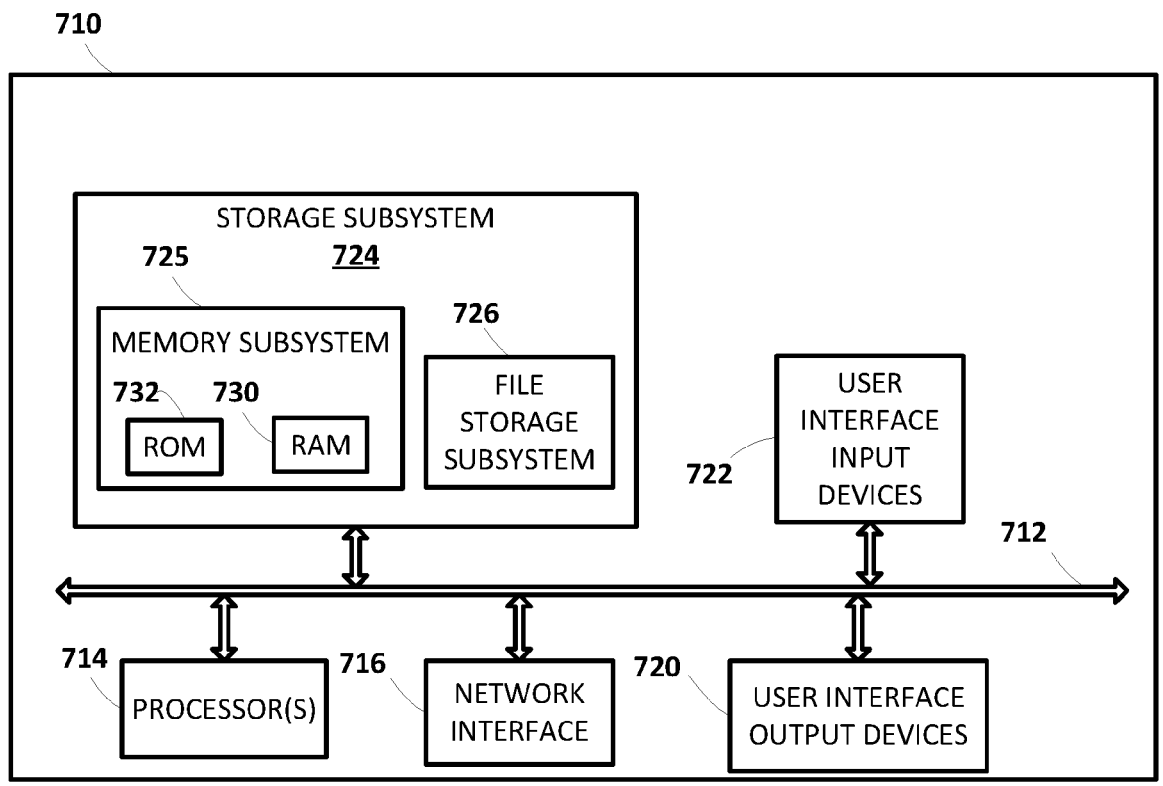
FIG. 7 schematically depicts an example architecture of a computer system.

FIG. 7 is a block diagram of an example computing device 710 that may optionally be utilized to perform one or more aspects of techniques described herein. Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of one or more methods described herein.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

What is claimed is:

1. A method of servoing an end effector of a robot, comprising:

determining a query image, the query image including a target object to be interacted with by an end effector of the robot;

at a first time step, generating an action prediction based on processing the query image, a scene image, and a previous action representation using a neural network model, wherein the scene image is captured by a vision component associated with the robot and captures the target object and the end effector of the robot, wherein the previous action representation is a previous action prediction of a previous time step, and wherein the neural network model includes one or more recurrent layers each including a plurality of memory units;

controlling the end effector of the robot based on the action prediction of the first time step;

at a second time step, generating an additional action prediction immediately subsequent to generating the action prediction of the first time step, the immediately subsequent action prediction generated based on processing the query image, an additional scene image, and the action prediction using the neural network model, wherein the additional scene image is captured by the vision component after controlling the end effector based on the action prediction of the first time step and captures the target object and the end effector; and controlling the end effector of the robot based on the additional action prediction.

2. The method of claim 1, wherein generating the action prediction of the first time step based on processing the query image, the scene image, and the previous action representation using the neural network model comprises:

processing the query image and the scene image using a plurality of visual layers of a visual portion of the neural network model to generate visual layers output;

processing the previous action representation using one or more action layers of an action portion of the neural network model to generate action output; and combining the visual layers output and the action output and processing the combined visual layers output and action output using a plurality of policy layers of the neural network model, the policy layers including the one or more recurrent layers.

3. The method of claim 2, wherein the plurality of memory units of the one or more recurrent layers comprise long short-term memory units.

4. The method of claim 2, wherein processing the query image and the scene image using the plurality of visual layers of the visual portion of the neural network model to generate visual layers output comprises:

processing the query image over a first convolutional neural network portion of the visual layers to generate a query image embedding;

processing the scene image over a second convolutional neural network portion of the visual layers to generate a scene image embedding; and generating the visual layers output based on the query image embedding and the scene image embedding.

5. The method of claim 4, wherein generating the visual layers output based on the query image embedding and the scene image embedding comprises processing the query image embedding and the scene image embedding over one or more additional layers of the visual layers.

6. The method of claim 1, wherein the action prediction of the first time step represents a velocity vector for displacement of the end effector in a robot frame of the robot.

7. The method of claim 1, wherein the determining the query image is based on user interface input from a user.

8. The method of claim 7, wherein the user interface input is typed or spoken user interface input, and wherein determining the query image based on user interface input from the user comprises:

selecting the query image, from a plurality of stock images, based on data, associated with the selected query image, matching one or more terms determined based on the user interface input.

9. The method of claim 1, wherein determining the query image based on user interface input from the user comprises:

causing the scene image or a previous scene image to be presented to the user via a computing device;

wherein the user interface input is received via the computing device and indicates a subset of the presented scene image or previous scene image; and generating the query image based on a crop of the scene image or the previous scene image, wherein the crop is determined based on the user interface input.

10. The method of claim 1, wherein the query image is generated based on an image captured by the vision component of the robot.

11. The method of claim 1, wherein the query image, the scene image, and the additional scene image are each two dimensional images.

12. A real robot comprising:

an end effector;

a vision component;

memory storing instructions and a neural network model;

one or more processors operable to execute the instructions to:

determine a query image, the query image including a target object to be interacted with by an end effector of the robot;

at a first time step, generate an action prediction based on processing the query image, a scene image, and a previous action representation using the neural network model, wherein the scene image is captured by the vision component and captures the target object and the end effector of the robot, wherein the previous action representation is a previous action prediction of a previous time step;

control the end effector of the robot based on the action prediction of the first time step;

at a second time step, generate an additional action prediction immediately subsequent to generating the action prediction of the first time step, the immediately subsequent action prediction generated based on processing the query image, an additional scene image, and the action prediction using the neural network model, wherein the additional scene image is captured by the vision component after controlling the end effector based on the action prediction of the first time step and captures the target object and the end effector; and control the end effector of the robot based on the additional action prediction.

13. The real robot of claim 12, wherein in generating the action prediction of the first time step based on processing the query image, the scene image, and the previous action representation using the neural network mode, one or more of the processors are to:

process the query image and the scene image using a plurality of visual layers of a visual portion of the neural network model to generate visual layers output;

processing the previous action representation using one or more action layers of an action portion of the neural network model to generate action output; and combine the visual layers output and the action output and process the combined visual layers output and action output using a plurality of policy layers of the neural network model, the policy layers including one or more recurrent layers.

14. The real robot of claim 13, wherein in processing the query image and the scene image using the plurality of visual layers of the visual portion of the neural network model to generate visual layers output, one or more of the processors are to:

process the query image over a first convolutional neural network portion of the visual layers to generate a query image embedding;

process the scene image over a second convolutional neural network portion of the visual layers to generate a scene image embedding; and generate the visual layers output based on the query image embedding and the scene image embedding.

15. The real robot of claim 14, wherein in generating the visual layers output based on the query image embedding and the scene image embedding, one or more of the processors are to process the query image embedding and the scene image embedding over one or more additional layers of the visual layers.

16. The real robot of claim 12, wherein the action prediction of the first time step represents a velocity vector for displacement of the end effector in a robot frame of the robot.

17. The real robot of claim 12, wherein the determining the query image is based on user interface input from a user.

18. The real robot of claim 17, wherein the user interface input is typed or spoken user interface input, and wherein in determining the query image based on user interface input from the user one or more of the processors are to:

select the query image, from a plurality of stock images, based on data, associated with the selected query image, matching one or more terms determined based on the user interface input.

19. The real robot of claim 12, wherein in determining the query image based on user interface input from the user one or more of the processors are to:

cause the scene image or a previous scene image to be presented to the user via a computing device;

wherein the user interface input is received via the computing device and indicates a subset of the presented scene image or previous scene image; and generate the query image based on a crop of the scene image or the previous scene image, wherein the crop is determined based on the user interface input.

20. The real robot of claim 12, wherein the query image is generated based on an image captured by the vision component of the robot.

* * * * *